Patented Feb. 27, 1940

2,191,943

UNITED STATES PATENT OFFICE 2,191,943

TANNING MATERIAL

Alfred Russell, Urbana, Ill., and John W. Copenhaver, Philadelphia, Pa., assignors to Röhm & Haas Company, Philadelphia, Pa.

No Drawing. Application August 23, 1938, Serial No. 226,244

13 Claims. (Cl. 260—45)

This invention relates to the manufacture of tanning materials suitable for making white leather from pickled stock, for bleaching chrome leather, for retanning leather already made by other means, for use in combination tannages with vegetable or other materials, and for various other uses in the tanning process. More particularly it relates to new tanning materials prepared by condensing a phenolic substance with an aliphatic or aromatic disulfonamide or their nitrogen substituted derivatives and an aliphatic aldehyde and, if necessary, treating the resulting resinous product to render it water soluble.

It is a matter of common knowledge that phenolic substances may be condensed with aldehydes and made water-soluble to give tanning materials. Materials thus produced generally have a methylene or alkylidene group connecting the phenolic groups. In accordance with the present invention the tanning substances are prepared by condensing the phenolic substance with a disulfonamide and formaldehyde so that the phenolic groups are connected through a group having the chemical structure

—CH$_2$—NH—SO$_2$—R—SO$_2$—NH—CH$_2$— wherein R is the organic group of a disulfonamide.

In making these condensates the reaction is carried out on the acid side of neutrality, preferably by dissolving the phenolic substance and disulfonamide in strong acid, heating to a temperature at which formaldehyde condenses readily with the phenol and disulfonamide, then adding the formaldehyde slowly while the mixture is being stirred. After all the aldehyde is added, the reaction mass is heated to the boiling point under reflux until the reaction is complete. If desired, however, the disulfonamide may be condensed with formaldehyde and then heated with the phenolic substance.

The phenolic substances that may be used are mononuclear phenolic compounds such as phenol, amyl phenol, etc., or polyphenolic substances such as naphthol, dihydroxy diphenyl dimethyl methanes, dihydroxy diphenyls, dihydroxy diphenyl sulfones, or mixtures thereof. Of particular value are 4-4'dihydroxy diphenyldimethyl methane and 4-4'dihydroxy diphenyl sulfone.

The disulfonamide may be either aromatic, such as phenylene disulfonamide, diphenyl ether disulfonamide, or aliphatic, such as diethyl ether disulfonamide, and decane 1-10 disulfonamide. A single or a mixture of disulfonamides may be used. The aldehyde used is preferably formaldehyde but others may be used in its place.

The relative proportion of reactants used may vary over a wide range, but we prefer to use substantially two molecular equivalents of aldehyde and two molecular equivalents of phenol for each molecular equivalent of disulfonamide. Satisfactory products may, however, be obtained using equimolecular proportions of the reactants or using two mols of formaldehyde to each mol of phenolic substance.

The phenol aldehyde-disulfonamide condensation product may be made water-soluble in a number of ways. Of these the most practical are to sulfonate the phenolic substance prior to condensation, to sulfonate the condensation product, and to heat the condensation product in an aromatic sulfonic acid, such as naphthalene sulfonic acid or a naphthalene sulfonic acid formaldehyde condensation product. When using the latter method some addition of aldehyde may, if desired, be added to the mixture of phenol aldehyde-disulfonamide condensate and aromatic sulfonic acid.

The preparation of the tanning material may be carried out under various conditions of time, temperature, concentration, etc. The values chosen for these factors in the following examples are convenient ones under which the reactions may be accomplished but do not represent necessarily the only conditions under which the same or essentially similar products may be made. These examples are given to illustrate the preparation of the tanning materials and should be understood in that light and not as a limitation of the invention.

*Example 1.*—50 parts of 4-4' dihydroxy diphenyl sulfone was dissolved in 70 parts of 98% sulfuric acid, the temperature raised to 110–113° C. and held there for 20 minutes until the dihydroxy diphenyl sulfone was sulfonated to a water soluble material. After cooling somewhat, 50 parts of water and 23.2 parts of diethyl ether disulfonamide were added. The temperature was then raised to 98–100° C., 20 parts of 30% aqueous formaldehyde added, and the whole held at 98–100° C. for 3 hours. The reaction mixture was then cooled, partly neutralized with 34 parts of sodium hydroxide, and diluted with water to a final mass of 520 parts.

*Example 2.*—16.4 parts of para-tertiary amyl phenol was dissolved in 14.7 parts of 98% sulfuric acid and heated to 80° C. for 2 hours or until the phenol was sulfonated to a water soluble product. It was then cooled and 10 parts of water and 11.6 parts diethyl ether disulfonamide were added. The mixture was then heated to 98-100° C. and 10 parts of 30% aqueous formaldehyde added, the whole heated with good stirring at 98-100° C. for 2 hours, then cooled, partially neutralized with 4 parts of sodium hydroxide, and diluted with water to a final mass of 210 parts.

*Example 3.*—22.8 parts of 4-4'dihydroxy diphenyl dimethyl methane was dissolved in 20 parts of 98% sulfuric acid and the solution heated with good stirring to 80° C. for an hour or until the product was entirely water soluble. The sulfonated phenolic compound was then cooled somewhat and diluted with 25 parts of water. 11.6 parts of diethyl ether disulfonamide was dissolved in the solution and the whole heated with good stirring to 98-100° C. 10 parts of 30% aqueous formaldehyde was added dropwise over 20 minutes. The reaction mixture was heated at 98-100° C. for an hour, cooled, partly neutralized with 6 grams of sodium hydroxide, and diluted with water to a final mass of 245 grams.

*Example 4.*—18.8 parts of phenol was sulfonated with 30 parts of 98% sulfuric acid at 110° C. for an hour. The phenol sulfonate was cooled somewhat, diluted with 50 parts of water, and 23.2 parts diethyl ether disulfonamide was dissolved in the solution. The mixture was then heated to 80° C., 20 parts of 30% aqueous formaldehyde added dropwise over 20 minutes and the whole heated at 80° C. for 3 hours. It was then cooled, partially neutralized with 12 parts of sodium hydroxide and diluted to the final mass of 275 grams.

*Example 5.*—25 parts of 4-4'dihydroxy diphenyl sulfone was sulfonated with two molecular equivalents (20 parts) of 98% sulfuric acid at 120° C. for 6½ hours. The sulfonated product was cooled, 5 parts of water, 10 parts of 30% aqueous formaldehyde, and 16.4 parts of 4-4'disulfonamide diphenyl ether were added. The reaction mixture was heated for 5 hours at 100° C., partially neutralized with 6 parts of sodium hydroxide, and diluted with water to 260 parts of a syntan solution.

*Example 6.*—25 parts of 4-4'dihydroxy diphenyl sulfone was sulfonated as in Example 5, cooled and diluted with 5 parts of water. 10 parts of 30% formaldehyde and 11.8 parts of benzene meta disulfonamide were added and the reaction mixture heated for 9 hours at 70° C. The condensation product was cooled, diluted, partially neutralized with 6 parts of sodium hydroxide, and made up to a total of 260 parts with water.

*Example 7.*—25 parts of 4-4'dihydroxy diphenyl sulfone was sulfonated as in Example 5, cooled and diluted with 5 parts of water. 10 parts of 30% formaldehyde and 14.3 parts of naphthalene-2,6-disulfonamide were added and the reaction mixture heated for 3 hours at 110° C., then cooled, neutralized and diluted to a total of 260 parts as described in Example 5.

*Example 8.*—25 parts of 4-4'dihydroxy diphenyl sulfone was sulfonated as in Example 5, cooled and diluted with 5 parts of water. 10 parts of 30% aqueous formaldehyde and 15 parts of decane 1,10-disulfonamide were added and the mixture heated for 3 hours at 100° C. and then diluted, partially neutralized, and made up to a total of 260 parts as in Example 5.

*Example 9.*—25 parts of 4-4'dihydroxy diphenyl sulfone was sulfonated as in Example 5, cooled and diluted with 5 parts of water. 10 parts of 30% aqueous formaldehyde and 17.6 parts of 4-4'di-N-methyl sulfonamide diphenyl ether were added and heated at 100° C. for 4 hours and then worked up as described in Example 5.

*Example 10.*—50 parts of 4-4'dihydroxy diphenyl sulfone and 23.8 parts of 4-4'disulfonamido diphenyl ether were suspended in 200 parts of concentrated hydrochloric acid. 20 parts of 30% aqueous formaldehyde was added and the reaction mixture refluxed for 2½ hours. The resin formed was separated from the acid liquor, washed with water, then boiled with water several times to remove acid and excess formaldehyde. The resin when cooled set to a light-colored mass which could easily be powdered. Elementary analysis showed the presence of nitrogen in large amounts. 25 parts of this resin, 25 parts of naphthalene sulfonic acid and 10 parts of water were mixed and heated on an oil bath at 110-130° C. with vigorous stirring until the mixture was completely soluble in water. It was then cooled and diluted to 208 parts with water.

*Example 11.*—10 parts of the insoluble resin as prepared in Example 10 was sulfonated with 12 parts of chlorosulfonic acid by gentle warming on a steam bath. When the product was completely water-soluble it was diluted to 85 parts with water.

*Example 12.*—23.8 parts 4-4'disulfonamido diphenyl ether, 20 parts of 30% aqueous formaldehyde and 50 parts of water were heated for 2 hours at 100° C. A white resin settled out which was washed to remove excess formaldehyde, cooled, dried and ground to a fluffy white powder. 25 parts of 4-4'dihydroxy diphenyl sulfone was sulfonated as described in Example 5 and diluted with 10 parts of water. 9.4 parts of the above resin was added and the mixture heated on an oil bath with stirring at 120-130° C. until a homogeneous mass soluble in water was formed. The reaction mixture was then diluted and partially neutralized as in Example 5.

*Example 13.*—25 parts of 4-4'dihydroxy diphenyl sulfone was sulfonated by heating 25 parts of 98% concentrated sulfuric acid at 120° for 2 hours. The sulfonated mixture was cooled and diluted with 5 parts of water. Then 6 parts of 4-4'diphenylether disulfonanilide and 6.5 parts of 30% aqueous formaldehyde were added and the resulting mixture condensed at 100° C. for 2 hours, cooled, diluted with water, partially neutralized with 17 parts concentrated ammonium hydroxide, and made up to a total of 260 parts with water.

The tanning solutions prepared by any of the foregoing examples may be used in the usual tanning process of converting pickled skins to leather. They may also be used for bleaching chrome tanned leather or in various combination tannages wherein the hides are first tanned with a vegetable, mineral or other synthetic tanning material and then retanned with the products herein described, or the hides may be first tanned with the products of this invention and given a retanning with other tanning materials. Those syntans made from hydroxy substituted diaryl compounds, in which the aryl nuclei are joined either directly as in phenyl phenol or by means of a bridge as in dihydroxy diphenyl dimethyl methane and dihydroxy diphenyl sulfone, are of particular value in the bleaching of chrome tanned leather.

We claim:

1. The process of preparing a material which when in water-soluble form has the property of converting hides and skins to leather which comprises co-condensing a phenol with less than an equimolecular proportion of a disulfonamide and an aldehyde in a strongly acid solution.

2. The process of preparing a material which when in water-soluble form has the property of converting hides and skins to leather which comprises co-condensing a hydroxy substituted diaryl compound with less than an equimolecular proportion of a disulfonamide and formaldehyde in a strongly acid solution.

3. The process of preparing a synthetic tanning material which comprises co-condensing a phenol sulfonic acid with less than an equimolecular proportion of a disulfonamide and formaldehyde.

4. The process of preparing a synthetic tanning material which comprises co-condensing two molecular proportions of a sulfonated phenol, one molecular proportion of a disulfonamide, and two molecular proportions of formaldehyde.

5. The process of preparing a synthetic tanning material which comprises co-condensing dihydroxy diphenylsulfone sulfonate with less than an equimolecular proportion of a disulfonamide and formaldehyde.

6. The process of preparing a synthetic tanning material which comprises co-condensing a phenol with less than an equimolecular proportion of a disulfonamide and formaldehyde in a strongly acid solution and heating the resinous material obtained with an aromatic sulfonic acid to render it water-soluble.

7. The process of preparing a synthetic tanning material which comprises co-condensing two molecular proportions of dihydroxy diphenylsulfone, one molecular proportion of a disulfonamide, and two molecular proportions of formaldehyde in a strongly acid solution and heating the resinous material obtained with naphthalene sulfonic acid to render it water-soluble.

8. A synthetic tanning material which is a water-solubilized joint condensation product of a phenol with less than an equimolecular proportion of a disulfonamide and an aldehyde.

9. A synthetic tanning material which is a water-solubilized joint condensation product of a hydroxy substituted diaryl compound with less than an equimolecular proportion of a disulfonamide and formaldehyde.

10. A synthetic tanning material which is a sulfonate of a condensation product of a phenol with less than an equimolecular proportion of a disulfonamide and formaldehyde.

11. A synthetic tanning material which is a joint condensation product of two molecular proportions of dihydroxy diphenylsulfone sulfonate, one molecular proportion of a disulfonamide, and two molecular proportions of formaldehyde.

12. A synthetic tanning material which is a joint condensation product of a phenol with less than an equimolecular proportion of a disulfonamide and formaldehyde made water-soluble by heating with an aromatic sulfonic acid.

13. A synthetic tanning material which is a joint condensation product of dihydroxy diphenyl sulfone with less than an equimolecular proportion of a disulfonamide and formaldehyde made water-soluble by heating with naphthalene sulfonic acid.

ALFRED RUSSELL.
JOHN W. COPENHAVER.